(12) United States Patent
Ye

(10) Patent No.: US 7,766,627 B2
(45) Date of Patent: Aug. 3, 2010

(54) MOTOR DEVICE FOR A FAN

(75) Inventor: Jin-Jing Ye, Kaohsiung (TW)

(73) Assignee: Asia Vital Components Co., Ltd., Kaohsiung (TW)

(*) Notice: Subject to any disclaimer, the term of this patent is extended or adjusted under 35 U.S.C. 154(b) by 885 days.

(21) Appl. No.: 11/609,699

(22) Filed: Dec. 12, 2006

(65) Prior Publication Data
US 2008/0138216 A1    Jun. 12, 2008

(51) Int. Cl.
*F04B 17/03* (2006.01)
*F04B 35/04* (2006.01)
*H02K 7/08* (2006.01)

(52) U.S. Cl. ................ 417/354; 417/423.12; 310/67 R; 310/90

(58) Field of Classification Search .......... 417/354, 417/423.12; 310/67 R, 90
See application file for complete search history.

(56) References Cited

U.S. PATENT DOCUMENTS

| 2,233,031 | A | * | 2/1941 | Price ........................ 60/686 |
| 5,267,842 | A | * | 12/1993 | Harmsen et al. ............ 417/354 |
| 6,511,303 | B2 | * | 1/2003 | Obara ................... 417/423.12 |

* cited by examiner

*Primary Examiner*—Charles G Freay

(57) ABSTRACT

A fan motor device includes a fan base, an impeller set and a motor set. The fan base extends a central barrel with ball bearings fitting with the barrel. The impeller set further includes an impeller, a shaft, a spring, a motor case and a magnet. The motor set further includes an insulation frame, a silicone sheet set, a coil and a circuit board. The barrel has an annular deep groove between the inner circumferential side and the outer circumferential side thereof for a stop ring being attached to an inner wall surface of the groove to reinforce the outer circumferential side so as to prevent the barrel from bending deformation and the motor set from displacing eccentrically or loosening off.

1 Claim, 3 Drawing Sheets

MOTOR DEVICE FOR A FAN

BACKGROUND OF THE INVENTION

1. Field of the Invention

The present invention is related to a fan motor device and particularly to a central barrel of a fan base in the fan motor device being strengthened with a reinforcing ring to prevent the central barrel from deformation and prevent a motor set of the fan motor from being disposed eccentrically or loosening off.

2. Brief Description of the Related Art

It is known that the computer is essential equipment at home or in an office. The execution speed of the central processing unit (CPU) in the computer is cared by the user as well. But, a high execution speed of the CPU usually results in high heat and high temperature and too much high temperature damages the CPU. In order to decrease heat caused by high execution speed of the CPU, a pre-cast squeezed aluminum radiator with a fan is placed on the CPU for dissipating heat effectively. Further, in order to remove heat from the CPU with much higher execution speed rapidly, the rotational speed of the fan is further increased to meet the requirement. The conventional fan as shown in FIG. 1 has a fan base 1' with a central barrel 3' and a motor set 3' is mounted to the barrel 3'. The fan base 1' is joined to an impeller set 2' to constitute the fan. However, the fan base 1' is deformed to bend inward after the fan runs a long period of time. As a result, the fan shaft is unable to rotate smoothly and, even more, the motor set 3' becomes loosening off. In addition, another conventional fan as shown in FIG. 2 provides the fan base 1' with a copper barrel 11' to fit with ball bearings and fan shaft. However, the copper barrel 11' is heavy so that it is hard to assemble with the ball bearings and the fan shaft and the heavy copper barrel 11' increases production cost.

SUMMARY OF THE INVENTION

Accordingly, an object of the present invention is to provide a fan motor device in which the barrel of the fan base has an annular deep groove between the inner circumferential side and the outer circumferential side thereof for a reinforcing ring being attached to an inner wall surface of the groove to strengthen the outer circumferential side so as to prevent the barrel from bending deformation for avoiding the motor set being disposed eccentrically or loosening off.

Another object of the present invention is to provide a fan motor device with which a fan with light weight can be obtained and parts of the fan can be assembled easily such that it is capable of enhancing production efficiency with low production cost.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
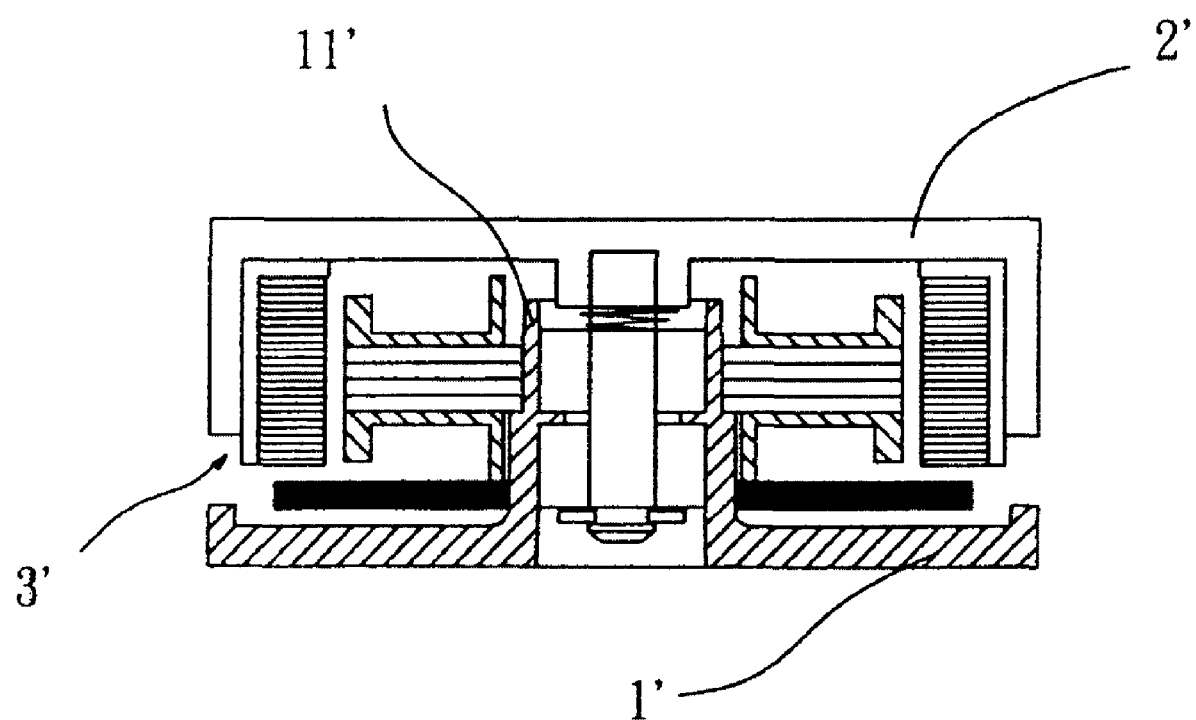
FIG. 1 is a sectional view illustrating the conventional fan motor.
Figure 2:
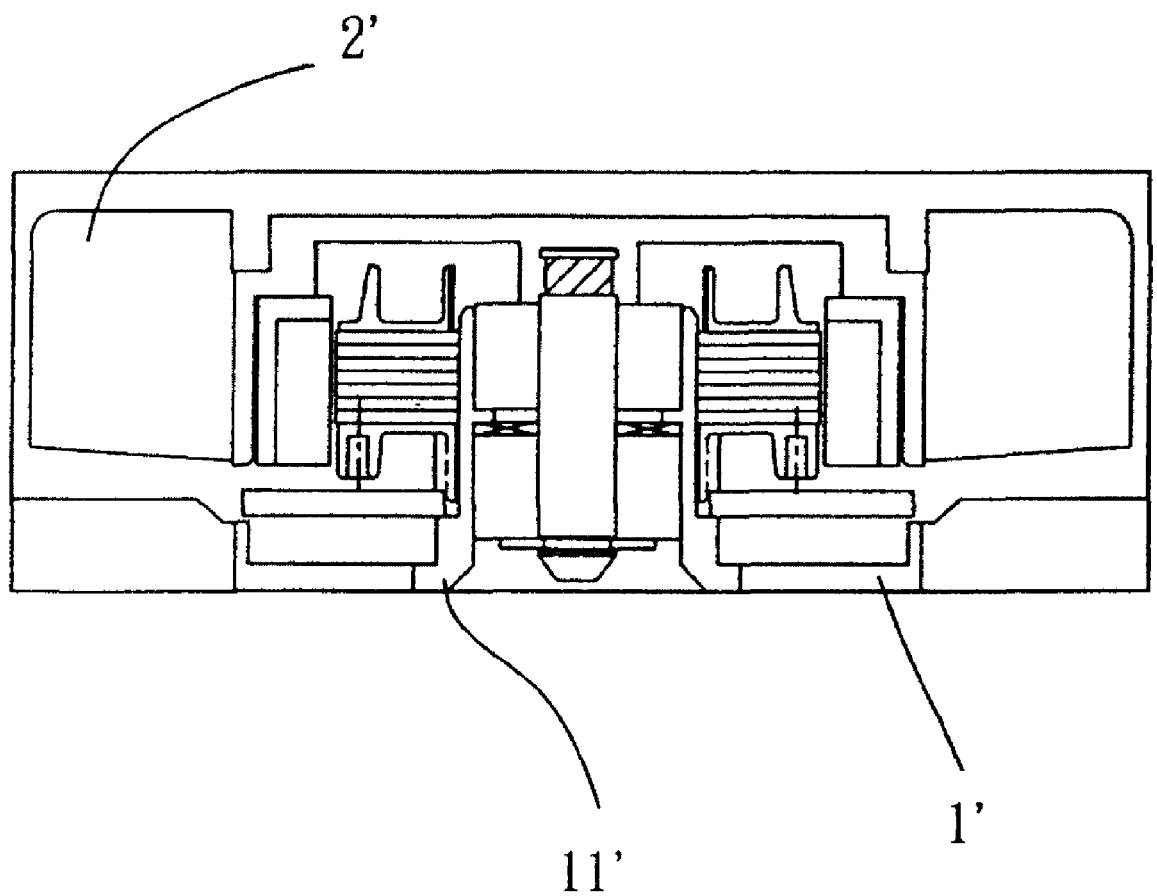
FIG. 2 is a sectional view illustrating another conventional fan motor.
Figure 3:
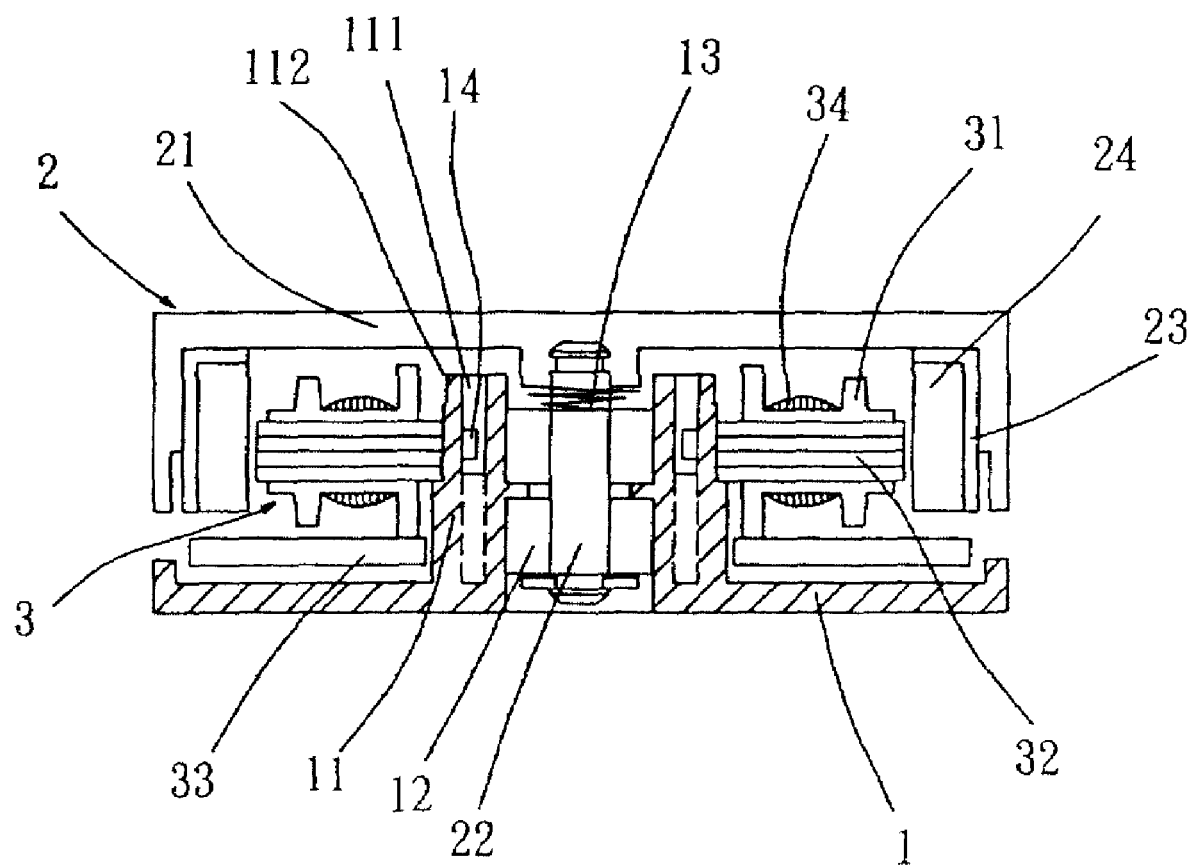
FIG. 3 is a sectional view of a fan motor according to the present invention.

Referring to FIG. 3, a fan motor according to the present invention includes a fan base 1, an impeller set 2 and a motor set 3. The fan base 1 has a central barrel 11 and the motor set 3 is mounted to the outer circumferential side of the barrel 11. A shaft 22 is disposed in the barrel 11 with an end of the shaft 22 being joined to the impeller set 2. The motor set 3 further includes an insulation frame 31, a silicone sheet set 32, a circuit board 33 and a coil 34. The silicone sheet set 32 is disposed at the middle section of the insulation frame 31 to surround the barrel 11 and is wound with the coil 34. The circuit board 33 is disposed between the fan base 1 and the insulation frame 31. The impeller set 2 is composed of an impeller 21, a motor case 23 and a magnet 24. As foregoing, the impeller set is joined to an end of the shaft 22. The motor case 23 is disposed at the inner circumferential side of the impeller 21 and the magnet 24 is disposed inside the motor case 23. There are two ball bearings 12 fitting with the inner circumferential side of the barrel 11 to allow the shaft 22 being movably joined to the ball bearings 12. A spring 13 is disposed between the center of the impeller set 2 and one of the ball bearings 12 to surround the shaft 22 such that the spring 13 is biased against the center of the impeller set 2 and the bearing 12 for stabling the impeller set 2 during running. The insulation frame 31 is attached to the outer cylindrical side 112 of the barrel 11 such that the motor set 3 is capable of being held in place. The barrel 11 has an annular deep groove 111 and a stop ring 14 is inserted in the annular deep groove 111 to strengthen the outer cylindrical side 112.

It is appreciated that the barrel 11 provides an annular deep groove 11 for the stop ring 14 being received in the annular deep groove 11 and joined to the outer wall of the annular deep groove 11. Hence, the stop ring 14 is capable of reinforcing the outer cylindrical side 112 and preventing the outer cylindrical side 112 from bending deformation. In this way, the motor set 3 is unable to run eccentrically or become loosening off.

While the invention has been described with referencing to preferred embodiments thereof, it is to be understood that modifications or variations may be easily made without departing from the spirit of this invention, which is defined by the appended claims.

What is claimed is:

1. A motor device for a fan comprising:
   a fan base having a central barrel extending therefrom, the barrel having an inner circumferential side and an outer circumferential side and the inner circumferential side fitting with a plurality of ball bearings;
   an impeller set further comprising an impeller, a shaft, a spring, a motor case and a magnet, wherein the shaft has two ends with one of the ends being attached to the center of the impeller and another one of the ends passing through the bearings, the spring is disposed between one of the bearings and the center of the impeller and surrounds the shaft, the motor case is disposed inside the impeller and the magnet is disposed inside the motor case; and
   a motor set further comprising an insulation frame being joined to the outer circumferential side, a silicone sheet set being mounted to a middle area of the insulation frame, a coil being wound to the insulation frame and a circuit board being disposed between the insulation frame and the fan base;

characterized in that barrel has an annular deep groove between the inner circumferential side and the outer circumferential side for a stop ring being attached to an inner wall surface of the groove to reinforce the outer circumferential side so as to prevent the barrel from deforming due to bending and prevent the motor set from displacing eccentrically or loosening off.

* * * * *